United States Patent
Lee et al.

(10) Patent No.: US 9,992,763 B2
(45) Date of Patent: *Jun. 5, 2018

(54) METHOD AND DEVICE FOR CONTROLLING TRANSMISSION POWER IN UPLINK TRANSMISSION

(71) Applicant: LG ELECTRONICS INC., Seoul (KR)

(72) Inventors: Moon Il Lee, Anyang-si (KR); Jae Hoon Chung, Anyang-si (KR); Hyun Soo Ko, Anyang-si (KR); Bin Chul Ihm, Anyang-si (KR); Yeong Hyeon Kwon, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/222,736

(22) Filed: Jul. 28, 2016

(65) Prior Publication Data

US 2016/0338017 A1    Nov. 17, 2016

Related U.S. Application Data

(63) Continuation of application No. 14/607,774, filed on Jan. 28, 2015, now Pat. No. 9,480,024, which is a
(Continued)

(30) Foreign Application Priority Data

Feb. 19, 2010    (KR) .................... 10-2010-0015218

(51) Int. Cl.
*G06F 11/00* (2006.01)
*H04J 1/16* (2006.01)
(Continued)

(52) U.S. Cl.
CPC .......... *H04W 72/02* (2013.01); *H04B 7/0404* (2013.01); *H04B 7/0691* (2013.01);
(Continued)

(58) Field of Classification Search
CPC ............. G01N 33/54386; G01N 33/76; G01N 2333/575
(Continued)

(56) References Cited

U.S. PATENT DOCUMENTS

| 8,379,581 B2 | 2/2013 | Imamura |
| 8,447,344 B2 * | 5/2013 | Ratasuk .............. H04W 52/146 370/252 |

(Continued)

FOREIGN PATENT DOCUMENTS

| EP | 1793509 | 6/2007 |
| KR | 100705448 | 4/2007 |
| WO | 2009008805 | 1/2009 |

OTHER PUBLICATIONS

European Patent Office Application Serial No. 10746432.3, Search Report dated Jun. 29, 2016, 9 pages.
(Continued)

*Primary Examiner* — Chuong T Ho
(74) *Attorney, Agent, or Firm* — Lee Hong Degerman Kang Waimey

(57) ABSTRACT

A user equipment in wireless communication system is provided. The user equipment includes an antenna unit including a plurality of antennas, a control unit for grouping the plurality of antennas into a predetermined number of antenna groups and controlling separately transmission power of each of the predetermined number of antenna groups, and a transmitting unit, connected to the control unit,
(Continued)

for transmitting at least one of data and control information to a base station via at least one of the predetermined number of antenna groups.

8 Claims, 2 Drawing Sheets

Related U.S. Application Data continuation of application No. 13/203,471, filed as application No. PCT/KR2010/001176 on Feb. 25, 2010, now Pat. No. 8,977,312.

(60) Provisional application No. 61/155,493, filed on Feb. 25, 2009, provisional application No. 61/155,519, filed on Feb. 26, 2009, provisional application No. 61/157,863, filed on Mar. 5, 2009, provisional application No. 61/161,420, filed on Mar. 19, 2009, provisional application No. 61/161,414, filed on Mar. 19, 2009, provisional application No. 61/169,699, filed on Apr. 15, 2009, provisional application No. 61/220,511, filed on Jun. 25, 2009.

(51) Int. Cl.
| | | |
|---|---|---|
| *H04L 1/00* | (2006.01) | |
| *H04L 12/26* | (2006.01) | |
| *H04W 72/02* | (2009.01) | |
| *H04B 7/06* | (2006.01) | |
| *H04W 52/14* | (2009.01) | |
| *H04W 52/36* | (2009.01) | |
| *H04W 72/04* | (2009.01) | |
| *H04W 52/34* | (2009.01) | |
| *H04B 7/0404* | (2017.01) | |
| *H04W 52/32* | (2009.01) | |
| *H04W 52/42* | (2009.01) | |
| *H04W 52/24* | (2009.01) | |

(52) U.S. Cl.
CPC ....... *H04W 52/146* (2013.01); *H04W 52/346* (2013.01); *H04W 52/367* (2013.01); *H04W 72/0413* (2013.01); *H04W 52/242* (2013.01); *H04W 52/325* (2013.01); *H04W 52/42* (2013.01); *H04W 72/0473* (2013.01)

(58) Field of Classification Search
USPC ............... 370/329, 330, 331, 252, 253, 254; 455/522
See application file for complete search history.

(56) References Cited

U.S. PATENT DOCUMENTS

| | | | |
|---|---|---|---|
| 8,977,312 B2* | 3/2015 | Lee, II | H04B 7/0691 455/522 |
| 9,480,024 B2* | 10/2016 | Lee, II | H04B 7/0691 |
| 2005/0197079 A1 | 9/2005 | Banister et al. | |
| 2006/0146756 A1 | 7/2006 | Wang et al. | |
| 2008/0025236 A1 | 1/2008 | Jones | |
| 2008/0186916 A1 | 8/2008 | Oshiba et al. | |
| 2008/0200203 A1 | 8/2008 | Malladi et al. | |
| 2008/0220806 A1 | 9/2008 | Shin et al. | |
| 2010/0029289 A1 | 2/2010 | Love et al. | |
| 2010/0189190 A1 | 7/2010 | Youtz et al. | |
| 2011/0081936 A1* | 4/2011 | Haim | H04W 52/367 455/522 |
| 2011/0261774 A1 | 10/2011 | Lunttila et al. | |
| 2015/0146663 A1 | 5/2015 | Lee et al. | |

OTHER PUBLICATIONS

Qualcomm Europe, "Support of Concurrent Transmission of PUCCH and PUSCH in LTE-A Uplink", R1-090362, 3GPP TSG RAN WG1 #55bis, Jan. 2009, 3 pages.

Qualcomm Europe, "Notion of Anchor Carrier in LTE-A", R1-090860, 3GPP TSG RAN WG1 #56, Feb. 2009, 5 pages.

Qualcomm Europe, "Carrier Aggregation in Heterogeneous Networks", R1-090861, 3GPP TSG RAN WG1 #56, Feb. 2009, 12 pages.

LG Electronics, "PUCCH piggybacking onto PUSCH in case of transmit power limitation," 3GPP TSG RAN WG1 #56, 1-090654, Feb. 2009, 4 pages.

LG Electronics, "Uplink multiple channel transmission in case of UE transmit power limitation", R1-090655, 3GPP TSG RAN WG1#56, Feb. 2009, 3 pages.

3GPP et al., "LTE; Evolved Universal Terrestrial Radio Access (E-UTRA); User Equipment (UE) Radio Transmission and Reception (3GPP TS 36.101 version 8.4.0 Release 8)", ETSI TS 136 101, V8.4.0, Jan. 2009.

European Patent Office Application Serial No. 17180291.1, Search Report dated Oct. 13, 2017, 9 pages.

3rd Generation Partnership Project; Technical Specification Group Radio Access Network; Evolved Universal Terrestrial Radio Access (E-UTRA); Physical layer procedures (Release 8), 3GPP TS 36.213 V8.5.0, Dec. 2008, 76 pages.

\* cited by examiner

[Fig. 1]
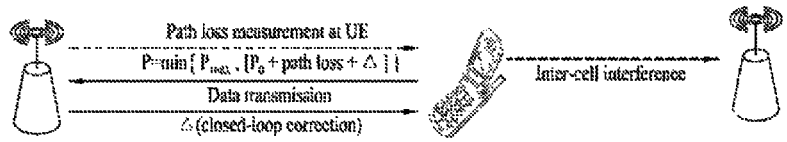
[Fig. 2]
[Fig. 3]
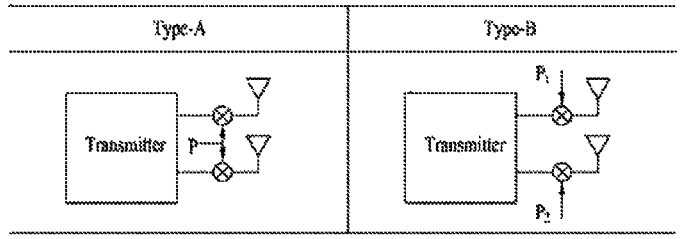
[Fig. 4]
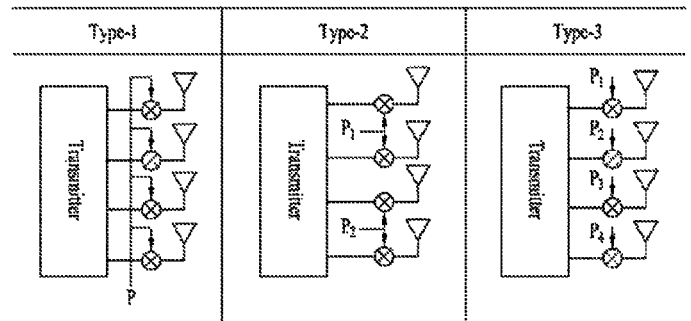

[Fig. 5]
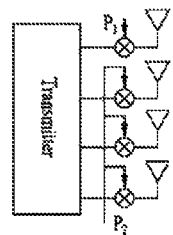
[Fig. 6]
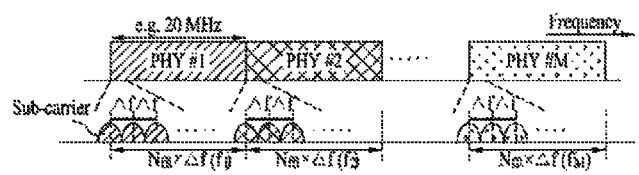
[Fig. 7]
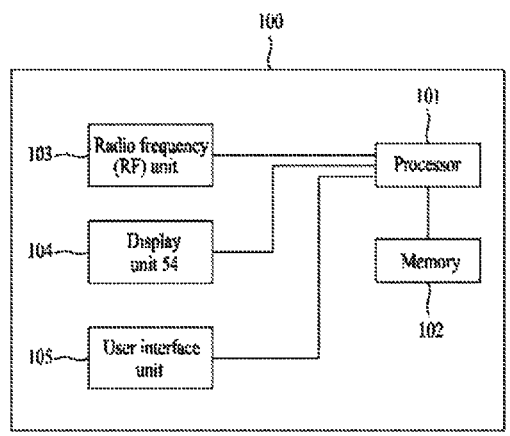

METHOD AND DEVICE FOR CONTROLLING TRANSMISSION POWER IN UPLINK TRANSMISSION

CROSS-REFERENCE TO RELATED APPLICATIONS

This application is a continuation of U.S. patent application Ser. No. 14/607,774, filed on Jan. 28, 2015, now U.S. Pat. No. 9,480,024, which is a continuation of U.S. patent application Ser. No. 13/203,471, filed on Aug. 25, 2011, now U.S. Pat. No. 8,977,312, which is the National Stage filing under 35 U.S.C. 371 of International Application No. PCT/KR2010/001176, filed on Feb. 25, 2010, which claims the benefit of earlier filing date and right of priority to Korean Application No. 10-2010-0015218, filed on Feb. 19, 2010 and also claims the benefit of U.S. Provisional Application No. 61/220,511, filed on Jun. 25, 2009, 61/169,699, filed on Apr. 15, 2009, 61/161,414, filed on Mar. 19, 2009, 61/161,420, filed on Mar. 19, 2009, 61/157,863, filed on Mar. 5, 2009, 61/155,519, filed on Feb. 26, 2009, and 61/155,493, filed on Feb. 25, 2009, the contents of which are all hereby incorporated by reference herein in their entirety.

TECHNICAL FIELD

The present invention relates to a method and device for controlling transmission power in uplink transmission.

BACKGROUND ART

The major objectives of power control are to guarantee a required received signal to noise ration (SNR) by compensating path-loss and fading of channel and to provide a high system throughput with proper link adaptation. In addition, inter-cell interference can be also handled by power control, in the 3rd generation partnership project (3GFP) long term evolution (LTE) system, the uplink power control is based on open-loop power control with closed-loop correction. The open-loop power control is handled by a user equipment (UE) and the closed-loop correction is done by an evolved Node B (eNB). FIG. 1 shows basic concept of uplink power control in LTE system.

As shown in FIG. 1, the uplink power is mainly measured by UE in open-loop manner and the eNB can adjust the uplink power by closed-loop correction factor $\Delta$.

The exact formula can be expressed as the following Math Figure 1.

$$P_{PUSCH}(i)=\min\{P_{MAX}, 10\log_{10}(M(i))+P_O(j)+\alpha(i) \cdot PL+\Delta_{TF}(i)+f(i)\} \text{ [dBm]} \quad \text{[Math Figure 1]}$$

In Math Figure 1, at a time index i, the
$P_{MAX}$
denotes the maximum allowed power, and it depends n the UE class. In addition,
$M(i)$
is decided according to allocated resource blocks which can varied from 1 to 110 and it is updated in every subframe. The
$\alpha \cdot PL$
is used as path loss compensation term where PL denotes downlink path-loss estimated by UE and is scaling value. The
$\alpha$
is equal to and less than 1 and is expressed as 3 bit value.

If
$\alpha$
$=1$ is satisfied, path loss is fully compensated and If
$\alpha$
$<1$ is satisfied, path loss is fractionally compensated.
In addition
$P_O(j)$
is calculated as the following Math Figure 2.

$$P_O = P_{O\_CELL\_SPECIFIC} + P_{O\_UE\_SPECIFIC} \quad \text{[Math Figure 2]}$$

In the Math Figure 1,
$f(i)$
is UE-specific parameter controlled by the eNB. In addition, the power control for Physical Uplink Control Channel (PUCCH) can be defined as the following Math Figure 3.

$$P_{PUCCH}(i)=\min\{P_{MAX}, P_{0\_PUCCH}+PL+h(n_{CQI}, n_{HARQ})+\Delta_{F\_PUCCH}(F)+g(i)\} \text{ [dBm]} \quad \text{[Math Figure 3]}$$

The parameter
$\Delta_{F\_PUCCH}(F)$
is provided by higher layers. Each
$\Delta_{F\_PUCCH}(F)$
value corresponds to a PUCCH format (F) relative to PUCCH format 1a. In addition,
$h(n)$
is a PUCCH format dependent value, where
$n_{CQI}$
corresponds to the number information bits for channel quality information (CQI) and
$n_{HARQ}$
is the number of hybrid automatic repeat request (HARQ) bits.

For PUCCH format 1,1a and 1b, the following Math Figure 4 is satisfied.

$$h(n_{CQI}, n_{HARQ})=0 \quad \text{[Math Figure 4]}$$

For PUCCH format 2, 2a, 2b and normal cyclic prefix, the following Math Figure 5 is satisfied.

$$h(n_{CQI}, n_{HARQ}) = \begin{cases} 10\log_{10}\left(\frac{n_{CQI}}{4}\right) & \text{if } n_{CQI} \geq 4 \\ 0 & \text{otherwise} \end{cases} \quad \text{[Math Figure 5]}$$

In addition, for PUCCH format 2 and extended cyclic prefix, the following Math Figure 6 is satisfied.

$$h(n_{CQI}, n_{HARQ}) = \begin{cases} 10\log_{10}\left(\frac{n_{CQI}+n_{HARQ}}{4}\right) & \text{if } n_{CQI}+n_{HARQ} \geq 4 \\ 0 & \text{otherwise} \end{cases} \quad \text{[Math Figure 6]}$$

$P_{O\_PUCCH}$
is a parameter composed of the sum of a cell specific parameter
$P_{O\_NOMINAL\_PUCCH}$
provided by higher layers and a UE specific component
$P_{O\_UE\_PUCCH}$
provided by higher layers.
$\delta_{PUCCH}$
is a UE specific correction value, also referred to as a Transmission Power Control (TPC) command, included in a PDCCH with DCI format 1A/1B/1D/1/2A/2 or sent jointly coded with other UE specific PUCCH correction values on a PDCCH with DCI format 3/3A whose CRC parity hits are scrambled with TPC-PUCCH-RNTI.

In addition to PUCCH and PUSCH, Sounding Reference Signal (SRS) is also power controlled as the following Math Figure 7.

$$P_{SRS}(i)=\min\{P_{MAX}, P_{SRS\_OFFSET}+10\log_{10}(M_{SRS})+P_{O\_PUSCH}(j)+\alpha\cdot PL+f(i)\}\ [dBm]\quad[\text{Math Figure 7}]$$

In the Math Figure 7, $P_{SRS}$
is UE transmission power for SRS transmitted on subframe i.
For
$K_S=1.25$.
$P_{SRS\_OFFSET}$
is a 4-bit UE specific parameter semi-statically configured by higher layers with 1 dB step size in the range [−3, 12] dB.
In addition, for
$K_S=0$.
$P_{SRS\_OFFSET}$
is a 4-bit UE specific parameter semi-statically configured by higher layers with 1.5 dB step size in the range [−10.5, 12] dB. Here, the Ks is a parameter for turning on or turning off
$\Delta_{TF}(i)$,
where
$\Delta_{TF}(i)$
is a parameter for controlling power of PUCCH.
$M_{SRS}$
is the bandwidth of the SRS transmission in subframe i expressed in number of resource blocks.
$f(i)$
is the current power control adjustment state for the PUSCH.
$P_{O\_PUSCH}(j)$
is a value composed of sum of cell-specific power control parameter and UE-specific power control parameter, which are configured by higher layers.

FIG. 2 illustrates general uplink transmitter structure in LTE system. AS shown in FIG. 2, only one antenna port transmission is allowed in uplink LTE system and in a time, single channel of PUCCH and PUSCH can be transmitted.

DISCLOSURE OF INVENTION

Technical Problem

The uplink power control is handled with whole UE transmission power due to single power amplifier (AMP) UE structure. However, if a UE employs multiple power AMPs, single power control factor may cause a significant problem in 2 Tx antenna case since power imbalance problem can happen due to a specific situation of handset (e.g., hand gripping). Therefore, appropriate power control mechanism should be designed for 2 Tx antenna case.

Meanwhile, PUSCH and PUCCH have their own power control factors as
$P_{PUCCH}(i)$
and
$P_{PUSCH}(i)$.
In addition, each channel can transmit maximum transmit power
$P_{MAX}$
in LTE system since both channels are never transmitted at the same time. However, if it is allowed to transmit both PUSCH and PUCCH at the same time, appropriate power sharing should be designed to enable simultaneous transmission of PUSCH and PUCCH in the advanced system (e.g., LTE-A).

Solution to Problem

Accordingly, the present invention is directed to a user equipment in wireless communication system, the user equipment including an antenna unit including a plurality of antennas; a control unit for grouping the plurality of antennas into a predetermined number of antenna groups and controlling separately transmission power of each of the predetermined number of antenna groups; and a transmitting unit, connected to the control unit, for transmitting at least one of data and control information to a base station via at least one of the predetermined number of antenna groups.

Preferably, the user equipment may further include a receiving unit for receiving information about turn-on or turn-off of each of the predetermined number of antenna groups.

Preferably, the antenna unit may include four antennas and the turn-on and the turn-off of each of the predetermined number of antenna groups may be configured as an index.

Also, there is a user equipment in wireless communication system, the user equipment including a control unit for controlling a maximum transmission power of Physical Uplink Control Channel (PUCCH) and a maximum transmission power of Physical Uplink Shared Channel (PUSCH); and a transmitting unit, connected to the control unit, for transmitting the PUCCH and the PUSCH simultaneously. The control unit controls the maximum transmission power of PUCCH to be higher than the maximum transmission power of PUSCH.

Preferably, when $P_{MAX}$ denotes a maximum transmission power of the user equipment, $P_{MAX,PUCCH}$ denotes the maximum transmission power of the PUCCH and $P_{MAX,PUSCH}$ denotes the maximum transmission power of the PUSCH, $P_{MAX}=a*P_{MAX,PUCCH}$, $P_{MAX}=b*P_{MAX}$, $a+b=1$ and $1=a>0.5$ may be satisfied.

Also, there is a user equipment supporting a plurality of uplink transmission bandwidths in wireless communication system, the user equipment including a control unit for controlling maximum transmission power of the plurality of uplink transmission bandwidths; and a transmitting unit, connected to the control unit, for transmitting the plurality of uplink transmission bandwidths to a base station. A primary maximum transmission power for transmitting a primary uplink transmission bandwidth among the plurality of uplink transmission bandwidths is allocated firstly from a maximum power of the user equipment and remaining transmission power of the maximum power of the user equipment is allocated to remaining uplink transmission bandwidths.

Preferably, each of the remaining uplink transmission bandwidths is determined by subtracting a corresponding offset value from the primary maximum power.

Advantageous Effects of Invention

According to the present invention, uplink transmission power can be saved in user equipment. In addition, uplink channels can be effectively can be transmitted.

BRIEF DESCRIPTION OF DRAWINGS

The accompanying drawings, which are included to provide a further understanding of the invention and are incorporated in and constitute a part of this application, illustrate embodiments of the invention and together with the description serve to explain the principle of the invention.

In the drawings:

FIG. 1 shows basic concept of uplink power control in LTE system.

FIG. 2 illustrates general uplink transmitter structure in LTE system.

FIG. 3 shows two uplink power control types in case of 2 Tx antennas according to the present invention.

FIG. 4 shows three uplink power control types in case of 4 TX antennas according to the present invention.

FIG. 5 illustrates an uplink in power control types in case of 4 TX antennas according to the present invention.

FIG. 6 shows an example of multi component carriers used for a UE.

FIG. 7 is a block diagram showing constitutional elements of a device performing a method of the present invention.

BEST MODE FOR CARRYING OUT THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings.

Hereinafter, multiple power control mechanism of the present invention can be employed for handling power imbalance between multiple antennas in the uplink.

FIG. 3 shows two uplink power control types in case of 2 Tx antennas according to the present invention. In 2 Tx, as shown in FIG. 3, uplink power control types can be considered. In type-A of FIG. 3, both transmission antennas always transmit the same power irrespective of power imbalance for the sake of simplicity. In this case, fine control of each transmit antenna cannot be allowed so power waste in a UE can be expected due to coarse power adjusting.

The type-B shows that power control is performed for each of the two antennas in uplink. Power saving in uplink is one of key features since it is closely related to battery efficiency. Therefore, by adjusting power for each of antennas, it would be possible to save more transmit power at a UE. For example, the power of the second antenna $P_2$ can be controlled by delta offset to the power of the first antenna $P_2$, i.e., $P_2 = P_1 + \Delta_{offset}$.

In this case, different type of power control can be employed according to uplink channel. The following Table 1 shows a combination of power control of PUSCH and PUCCH in case of 2 TX antennas.

TABLE 1

|  | PUSCH | PUCCH |
|---|---|---|
| Case-A | Type-A | Type-A |
| Case-B | Type-A | Type-B |
| Case-C | Type-B | Type-A |
| Case-D | Type-B | Type-B |

Meanwhile, 4 Tx antennas can be employed in UE. FIG. 4 shows three uplink power control types in case of 4 TX antennas according to the present invention.

The type 1 shows the same power transmission across all the transmission antennas. This type has the least complexity and control overhead. However, power saving performance would be worst among the three types due to its coarse power adjustment. To improve the performance, group-wise power control can be used in which two antenna groups from four antenna ports have its own power control factor as shown in type-2 in FIG. 4. An antenna group may have one or higher number of antenna ports and the other antenna port belongs to the other antenna group in this case. Antenna power control can be also used for 4 Tx antennas to provide better power saving performance. In this case, different type of power control can be employed according to the uplink channel as shown in the following Table 2.

TABLE 2

|  | PUSCH | PUCCH |
|---|---|---|
| Case-1 | Type-1 | Type-1 |
| Case-2 | Type-1 | Type-2 |
| Case-3 | Type-1 | Type-3 |
| Case-4 | Type-2 | Type-1 |
| Case-5 | Type-2 | Type-2 |
| Case-6 | Type-2 | Type-3 |
| Case-7 | Type-3 | Type-1 |
| Case-8 | Type-3 | Type-2 |
| Case-9 | Type-3 | Type-3 |

In Table 1 and Table 2, several cases are mentioned for 2 Tx and 4 Tx antenna ports. Among the cases, the following Table 3 can be considered as appropriate case as an exemplary from the optimal tradeoff between control signaling overhead and power saving performance.

TABLE 3

|  | 2Tx | 4Tx |
|---|---|---|
| Ex-1 | Case-A | Case-1 |
| Ex-2 | Case-A | Case-4 |
| Ex-3 | Case-A | Case-5 |
| Ex-4 | Case-C | Case-1 |
| Ex-5 | Case-C | Case-4 |
| Ex-6 | Case-D | Case-1 |
| Ex-7 | Case-D | Case-5 |
| Ex-8 | Case-D | Case-9 |

Each transmission antenna has its own maximum power $P_{MAX}$ as shown in Math Figure 1 and the maximum power depends on the UE class. Therefore, the maximum power is fixed in the UE perspective. If the $P_{MAX}$ is allowed to be configured by the eNB, antenna power imbalance problem can be solved easily and the eNB has an ability to turn on/off a specific transmit antenna port at a UE if multiple power control factor is employed.

As in type-B in FIG. 3, $P_1$ and $P_2$ can be used for per antenna based power control. In that case, in general, $P_1$ and $P_2$ have same $P_{MAX}$ under the assumption that same physical antenna and power AMP are employed for each transmit antenna port and the $P_{MAX}$ is fixed value. Here, each antenna port cannot transmit power higher than $P_{MAX}$. Therefore, by allowing configurable $P_{MAX}$ for each transmit antennas, flexible power control is possible in the uplink.

Let $P_{1,MAX}$ and $P_{2,MAX}$ be maximum power for $P_1$ and $P_2$, respectively. Then, multiple values for $P_{1,MAX}$ and $P_{2,MAX}$ can be used so as to allow flexible power control. The multiple values can be expressed as $\alpha_1 P_{1,MAX}$ and $\alpha_2 P_{2,MAX}$ , where $\alpha_1$ and $\alpha_2$ has several values including '0' and '1'. If $\alpha_1 = 0$ is used for an antenna port, which implies that the corresponding antenna port is turned off.

This can also be applied for type-3 in FIG. 5 in the same manner. In addition, $P_{1,MAX}$ and $P_{2,MAX}$ can be fixed value per UE or UE class.

If two or more number of power control factor are used according to the type, the power can be separately defined according to the uplink channel. Let $P_1$ and $P_2$ be the power control factors for each transmit antenna and/or antenna group. The $P_{MAX}$ can be defined as following Table 4 when multiple channels (e.g., PUCCH and PUCCH) are transmitted at the same time.

TABLE 4

| | |
|---|---|
| $P_{MAX}$ | $P_{MAX} = P_{1,MAX} + P_{2,MAX}$ |
| $P_{1,MAX}$ | $P_{1,MAX} = P_{1,PUSCH,MAX} + P_{1,PUCCH,MAX}$ |
| $P_{2,MAX}$ | $P_{2,MAX} = P_{2,PUSCH,MAX} + P_{2,PUCCH,MAX}$ |
| Type-P | $P_{1,PUCCH,MAX} = P_{2,PUCCH,MAX} = P_{PUCCH,MAX}/2$ $P_{1,PUSCH,MAX} = P_{1,MAX} - P_{1,PUCCH,MAX} P_{2,PUCCH,MAX} = P_{2,MAX} - P_{2,PUCCH,MAX}$ |
| Type-Q | $P_{1,PUSCH,MAX} = P_{2,PUSCH,MAX} = P_{PUSCH,MAX}/2$ $P_{1,PUCCH,MAX} = P_{1,MAX} - P_{1,PUSCH,MAX} P_{2,PUCCH,MAX} = P_{2,MAX} - P_{2,PUSCH,MAX}$ |

In addition, the $P_{MAX}$ can be defined as following Table 5 when PUCCH and SRS are transmitted at the same time.

TABLE 5

| | |
|---|---|
| $P_{MAX}$ | $P_{MAX} = P_{1,MAX} + P_{2,MAX}$ |
| $P_{1,MAX}$ | $P_{1,MAX} = P_{1,SRS,MAX} + P_{1,PUCCH,MAX}$ |
| $P_{2,MAX}$ | $P_{2,MAX} = P_{2,SRS,MAX} + P_{2,PUCCH,MAX}$ |
| Type-P | $P_{1,PUCCH,MAX} = P_{2,PUCCH,MAX} = P_{PUCCH,MAX}/2$ $P_{1,SRS,MAX} = P_{1,MAX} - P_{1,PUCCH,MAX} P_{2,SRS,MAX} = P_{2,MAX} - P_{2,PUCCH,MAX}$ |
| Type-Q | $P_{1,SRS,MAX} = P_{2,SRS,MAX} = P_{SRS,MAX}/2$ $P_{1,PUCCH,MAX} = P_{1,MAX} - P_{1,SRS,MAX} P_{2,PUCCH,MAX} = P_{2,MAX} - P_{2,SRS,MAX}$ |

Furthermore, the $P_{MAX}$ can be defined as following Table 6 when PUSCH and SRS are transmitted at the same time.

TABLE 6

| | |
|---|---|
| $P_{MAX}$ | $P_{MAX} = P_{1,MAX} + P_{2,MAX}$ |
| $P_{1,MAX}$ | $P_{1,MAX} = P_{1,SRS,MAX} + P_{1,PUSCH,MAX}$ |
| $P_{2,MAX}$ | $P_{2,MAX} = P_{2,SRS,MAX} + P_{2,PUSCH,MAX}$ |
| Type-P | $P_{1,PUSCH,MAX} = P_{2,PUSCH,MAX} = P_{PUSCH,MAX}/2$ $P_{1,SRS,MAX} = P_{1,MAX} - P_{1,PUSCH,MAX} P_{2,SRS,MAX} = P_{2,MAX} - P_{2,PUSCH,MAX}$ |
| Type-Q | $P_{1,SRS,MAX} = P_{2,SRS,MAX} = P_{SRS,MAX}/2$ $P_{1,PUSCH,MAX} = P_{1,MAX} - P_{1,SRS,MAX} P_{2,PUSCH,MAX} = P_{2,MAX} - P_{2,SRS,MAX}$ |

In addition, the $P_{MAX}$ can be defined as following Table 7 when PUSCH, PUCCH and SRS are transmitted at the same time.

TABLE 7

| | |
|---|---|
| $P_{MAX}$ | $P_{MAX} = P_{1,MAX} + P_{2,MAX}$ |
| $P_{1,MAX}$ | $P_{1,MAX} = P_{1,SRS,MAX} + P_{1,PUSCH,MAX} + P_{1,PUCCH,MAX}$ |
| $P_{2,MAX}$ | $P_{2,MAX} = P_{2,SRS,MAX} + P_{2,PUSCH,MAX} + P_{2,PUCCH,MAX}$ |
| Type-P | $P_{1,PUCCH,MAX} = P_{2,PUCCH,MAX} = P_{PUCCH,MAX}/2$ $P_{1,PUSCH,MAX} = P_{2,PUSCH,MAX} = P_{PUSCH,MAX}/2$ $P_{1,SRS,MAX} = P_{1,MAX} - (P_{1,PUCCH,MAX} + P_{1,PUSCH,MAX}) P_{2,SRS,MAX} = P_{2,MAX} - (P_{2,PUCCH,MAX} + P_{2,PUSCH,MAX})$ |
| Type-Q | $P_{1,PUCCH,MAX} = P_{2,PUCCH,MAX} = P_{PUCCH,MAX}/2$ $P_{1,SRS,MAX} = P_{2,SRS,MAX} = P_{SRS,MAX}/2$ $P_{1,PUSCH,MAX} = P_{1,MAX} - (P_{1,PUCCH,MAX} + P_{1,SRS,MAX}) P_{2,PUSCH,MAX} = P_{2,MAX} - (P_{2,PUCCH,MAX} + P_{2,SRS,MAX})$ |

Even though the relationships are defined for multiple power control factors for each antenna ports and/or each antenna groups, same rules can be applied for single power control factor for whole antenna ports.

UE informs its maximum transmittable power for each transmission antenna ports such as $P_{1,UE,MAX}$ and $P_{2,UE,MAX}$ where the former indicates the maximum transmittable power of first antenna port and/or first antenna group and the latter indicates that of second antenna port and/or antenna group. From this reports, the eNB can choose each antennas and/or each antenna groups maximum power $P_{1,MAX}$ and $P_{2,MAX}$.

The power control factor can be switched across the antenna port. Let $A_i, i = 0, \ldots, N_t - 1$ be i-th antenna port, then power control factors $P_i$ in type-B of FIG. 3 can be mapped as the following Table 8.

TABLE 8

| Switching | Power control factor mapping |
|---|---|
| off | $\{A_0 : P_0\}$, $\{A_1 : P_1\}$ |
| on | $\{A_0 : P_1\}$, $\{A_1 : P_0\}$ |

This switching can be configured by eNB or done by UE request. The switching can be more complicated for 4 Tx case. The type-2 in FIG. 4 can be defined according to the switching rule shown in the following Table 9.

TABLE 9

| Switching | Power control factor mapping |
|---|---|
| off | $\{AG_0 : P_0\}$, $\{AG_1 : P_1\}$ |
| on | $\{AG_0 : P_1\}$, $\{AG_1 : P_0\}$ |

In Table 9, $AG_i, i = 0, 1$ indicates antenna groups in which four antenna ports are separated to two groups.

FIG. 5 illustrates an uplink power control types in case of 4 TX antennas according to the present invention. The number of antenna ports in each group can be different as shown in FIG. 5.

The antenna ports in an $AG_1$ can be changed according to time, frequency or uplink channel and UE class. The following Table 10 shows an exemplary antenna grouping.

TABLE 10

|      | Antenna grouping |
| --- | --- |
| Ex-1 | $AG_0 : \{A_0, A_1\}$, $AG_1 : \{A_2, A_3\}$ |
| Ex-2 | $AG_0 : \{A_0, A_2\}$, $AG_1 : \{A_1, A_3\}$ |
| Ex-3 | $AG_0 : \{A_0\}$, $AG_1 : \{A_1, A_2, A_3\}$ |
| Ex-4 | $AG_0 : \{A_1\}$, $AG_1 : \{A_0, A_2, A_3\}$ |
| Ex-5 | $AG_0 : \{A_2\}$, $AG_1 : \{A_0, A_1, A_3\}$ |
| Ex-6 | $AG_0 : \{A_3\}$, $AG_1 : \{A_0, A_1, A_2\}$ |

To have multiple power control factors such as $P_1$ and $P_2$, only UE specific correction value can have multiple values such as $f_1(i), g_1(i)$ for $P_1$ and $f_2(t), g_2(t)$ for $P_2$, and the others are shared across the power control factors since the UE specific correction value is a closed-loop power control handled by an eNB so that more precise power adjustment is possible.

Abovernentioned power control type can vary in time n a UE point of view and may be configured by eNB in semi-static manner.

According to the UE class, the number of power control actor can be different with same number of antenna port.

Each power control factors $P_1$ can includes zero power transmission, that is, antenna turn off, so that only specific antenna and/or antenna group can transmit power. This can be controlled by several ways as the following.

Each antenna or antenna group may have its own maximum transmission power limitation such as $P_{1,max}$ and $P_{2,max}$ and the maximum transmission power can be controlled by on/off factor which is configured by the eNB. The on/off control factor can be expressed as $\alpha$ and $\beta$.

These control factors may have only two values that is '0' or '1' and the value '0' indicates turning off corresponding antenna, thereby four cases can be defined as Table 11 and Table 12.

TABLE 11

| index | Description |
| --- | --- |
| 00 | $\alpha = 0$, $\beta = 0$ both antennas or antenna groups are turned off, thereby no uplink transmission. (Silent mode) |
| 01 | $\alpha = 0$, $\beta = 1$ first antenna or antenna group is turned off. |
| 10 | $\alpha = 1$, $\beta = 0$ second antenna or antenna group is turned off. |
| 11 | $\alpha = 1$, $\beta = 1$ full antenna transmission (normal transmission mode) |

TABLE 12

| index | Description |
| --- | --- |
| 00 | $\alpha = 0$, $\beta = 0$ Reserved for other purpose |
| 01 | $\alpha = 0$, $\beta = 1$ first antenna or antenna group is turned off. |
| 10 | $\alpha = 1$, $\beta = 0$ second antenna or antenna group is turned off. |
| 11 | $\alpha = 1$, $\beta = 1$ full antenna transmission (Normal transmission mode) |

A specific power control factor controlled by eNB may force a UE to turn off a specific antenna or antenna group in order not to waste transmission power.

Meanwhile, SRS is used to estimate channel information at an eNB side, therefore each antenna should transmit reference signal. However, due to higher signaling overhead, the eNB can request SRS for a specific antenna or antenna group. This may be used with antenna turn off mechanism mentioned above. The 2 bit indication can be used to support four types of SRS request for 2 Tx and 4 Tx transmission antenna case. For 2 Tx case, SRS transmission can be classified as Table 13.

TABLE 13

| indication | Description |
| --- | --- |
| 00 | Silent mode or reserved |
| 01 | First antenna only transmits SRS |
| 10 | Second antenna only transmits SRS |
| 11 | Both antenna transmit SRS |

In addition, for 4 Tx case, the following Table 14 can be considered.

TABLE 14

| indication | Description |
| --- | --- |
| 00 | Silent mode or reserved |
| 01 | First antenna group only transmits SRS |

TABLE 14-continued

| indication | Description |
|---|---|
| 10 | Second antenna group only transmits SRS |
| 11 | Both antenna group transmit SRS |

In Table 14, antenna group can be configured as shown in FIG. 4 and FIG. 5, for example. However, it is not limited to FIG. 4 and FIG. 5.

Hereinafter, a power control method for transmitting PUSCH and PUCCH simultaneously will be described.

The Math Figures 1 and 3 can be represented as following Math Figures 8 and 9 for the sake of simplicity, respectively.

$$P_{PUSCH}(i)=\min\{P_{MAX}, P_{PUSCH}^{required}(i)\}[\text{dBm}] \quad \text{[Math Figure 8]}$$

In Math Figure 8
$P_{PUSCH}^{required}$
can be $$P_{PUSCH}^{required}(i)=10\log_{10}(M_{PUSCH}(i))+P_{O\_PUSCH}(j)+\alpha(j)\cdot PL+\Delta_{TF}(i)+f(i)$$

if the same power control method is used for advanced system (e.g., LTE-A).

Therefore, in general,
$P_{PUSCH}^{required}$
implies that required transmission power to reach the error requirement and it can be designed by any other method.

$$P_{PUCCH}(i)=\min\{P_{MAX}, P_{MAX}, P_{PUCCH}^{required}(i)\}[\text{dBm}] \quad \text{[Math Figure 9]}$$

In Math Figure 9,
$P_{PUCCH}^{required}$
can be $$P_{PUCCH}^{required}(i)=P_{O\_PUCCH}PL+h(n_{CQI}, n_{HARQ})+\Delta_{F\_PUCCH}(F)+g(i),$$

however, it is not restricted to the Math Figure 3 as well. Therefore,
$P_{PUCCH}^{required}$
also simply implies required transmission power to meet the received SNR requirement and can be designed by several ways.

In addition to PUSCH and PUCCH, SRS power control factor also can be simplified as the following Math Figure 10.

$$P_{SRS}(i)=\min\{P_{MAX}, P_{SRS}^{required}(i)\} \quad \text{[Math Figure 10]}$$

In Math Figure 10, the
$P_{MAX}$
is the maximum allowed transmission power and configured by higher layer signaling. Therefore, to transmit both PUSCH and PUCCH simultaneously, the
$P_{MAX}$
should be shared by both channels. In this case, several types of power sharing can be considered.

Hereafter,
$P_{MAX}^{PUSCH}$
and
$P_{MAX}^{PUCCH}$
denote maximum allowed transmission power for PUSCH and PUCCH respectively.

Therefore, $$P_{MAX}=P_{MAX}^{PUSCH}+P_{MAX}^{PUCCH}$$

should be satisfied in simultaneous transmission ease. In the other cases such as PUCCH only transmission or PUSCH only transmission, $$P_{MAX}=P_{MAX}^{PUSCH}=P_{MAX}^{PUCCH}$$

can be used.

The
$P_{MAX}$
can be evenly shared for both PUCCH and PUCCH. In this case, the power sharing relationship can be expressed as $$P_{MAX}^{PUSCH}=P_{MAX}^{PUCCH}=P_{MAX}/2.$$

This even power sharing can be simplest power sharing method since the maximum power is divided by two and no additional signaling is needed.

In general, the control channel (i.e., PUCCH) requires higher reliability compared to traffic channel (i.e., PUSCH) since an error in control channel more seriously degrades system throughput as compared with that in traffic channel. Therefore, PUCCH channel can be prioritized to spend more transmission power. If control channel is well designed to reach an error requirement without full power transmission, the traffic channel prioritized power sharing method also can be considered. The following Math Figure 11 denotes prioritized power sharing method.

$$\begin{cases} P_{MAX}^{PUSCH} = \dfrac{\alpha}{\alpha+\beta}P_{MAX} \\ P_{MAX}^{PUCCH} = \dfrac{\beta}{\alpha+\beta}P_{MAX} \end{cases} \quad \text{[Math Figure 11]}$$

In Math Figure 11,
α
and
β
are a rational number which is equal to or larger than '0' and satisfies the condition $\alpha+\beta=1$.

If $\alpha>0.5$ is satisfied, the PUSCH can have higher maximum power and PUCCH can have maximum power in the other case.

Meanwhile, the PUCCH transmission can be guaranteed by allowing maximum power transmission as $$P_{MAX}^{PUCCH}=P_{MAX}.$$

The maximum transmission power for PUSCH transmission can be defined as the following Math Figure 12.

$$P_{MAX}^{PUSCH}(i)=P_{MAX}-P_{PUCCH}(i) \quad \text{[Math Figure 12]}$$

In this case, the
$P_M^{PUCCH}$
may be configured by higher layer and
$P_{MAX}^{PUSCH}$
can be calculated by UE as the
$P_{PUCCH}(i)$
value get changed in time.

If PUSCH transmission is guaranteed, the power allocation method mentioned above can be switched between PUSCH and PUSCH. In this case, the maximum power transmission for PUSCH can be $$P_{MAX}^{PUSCH}=P_{MAX}$$

and the Math Figure 12 should be changed into Math Figure 13.

$$P_{MAX}^{PUCCH}(i)=P_{MAX}-P_{PUSCH}(i) \quad \text{[Math Figure 13]}$$

Meanwhile, the $P_{MAX}^{PUSCH}$ and the $P_{MAX}^{PUCCH}$ can be configured separately by higher layer signaling. In this case, separate maximum transmission power should be informed to a UE such as PUSCH only transmission. PUCCH only transmission and simultaneous transmission for more efficient power allocation as the following Table 15.

TABLE 15

| | Maximum allowed transmission power |
|---|---|
| PUCCH only | $P_{MAX}^{PUCCHonly}$ |
| PUSCH only | $P_{MAX}^{PUSCH\ only}$ |
| Simultaneous Transmission | $P_{MAX}^{PUSCH}$ and $P_{MAX}^{PUCCH}$ |

Meanwhile, in PUCCH transmission, several types of information are included such as Acknowledgement/Negative Acknowledgment (ACK/NACK), Channel Quality Information (CQI), Rank Information (RI) and Precoding Matrix Index (PMI). Even in PUCCH transmission, ACK/NACK should be strongly protected when multiple uplink channel transmission is possible in a same subframe. In addition to ACK/NACK, RI also needs to be protected. Therefore, when at least one of ACK/NACK and RI is transmitted, the following UE behavior can be defined.

In the first type, other uplink channels including PUSCH and SRS are not allowed to be transmitted.

In the second type, PUCCH is first guaranteed and if there is remaining power, the remaining power is shared with the other channels. In this case, the information such as CQI and PMI cannot be guaranteed.

Meanwhile, if unbalanced power allocation is employed for simultaneous transmission of PUSCH and PUCCH, according to allowed maximum power, one of the uplink channels can be dropped if the allowed maximum power is not exceed a certain level of power. For instance, when threshold level is set to $P_{Threshold}$ as a reference, a UE can check whether maximum allowed transmission power is higher than $P_{Threshold}$ and if $P_{MAX}^{PUSCH}$ and $P_{MAX}^{PUCCH}$ is lower than $P_{Threshold}$, dropping corresponding channel at a time.

Abovementioned maximum allowed transmission power $P_{MAX}^{PUSCH}$ and $P_{MAX}^{PUCCH}$ can be shared with multiple antennas if multiple $P_{MAX}^{PUSCH}$ and/or) $P_{MAX}^{PUCCH}$ are employed for better supporting multiple transmit antennas.

Meanwhile, if multi-carrier is employed for a single UE, the $P_{MAX}$ should be shared for multi-carrier as well.

First, a description is given of the concepts of the term multi-carrier and the term component carrier. Multi-carrier indicates a total frequency band that is used by the UE and has the same meaning as whole band.

The component carrier is one of the component carriers that constitute the multi-carrier. That is, a plurality of component carriers constitutes a multi-carrier through carrier aggregation. Each component carrier includes a plurality of lower bands. Here, when the term multi-carrier is replaced with whole band, the aggregation of component carriers may be referred to as bandwidth aggregation. The term lower band, which indicates a sub-band, may be replaced with partial band. The carrier aggregation aggregates a plurality of carriers to extend the bandwidth in order to increase the data rate. For example, the conventional system uses 20 MHz as one carrier, whereas the system of the present invention aggregates five 20 Mhz carriers to extend the bandwidth up to 100 MHz. The carrier aggregation includes aggregation of carriers that are located in different frequency bands.

FIG. 6 shows an example of multi component carriers used for a UE. In FIG. 6, each component carrier can be regarded as independent physical channel (PHY) or LTE channel.

Let the $P_{MAX}$ be a maximum allowed transmission power in uplink for whole component carriers aggregated and the number of component carrier can vary according to time in a UE perspective. For instance, if the number of the uplink component carrier ($N_{comp}$) for a UE can vary from 1 to 5 (i.e., $1 \leq N_{comp} \leq 5$), then the $P_{MAX}$ can be shared by $N_{comp}$ component carriers. For the multiple component carriers, followings can be considered.

The maximum allowed power $P_{MAX}$ can be equally shared by $N_{comp}$ component carriers. Therefore, each component carrier may have $P_{MAX}/N_{comp}$ maximum allowed power. In addition, each component carrier may have same or different $P_{MAX}^{PUSCH}$ and $P_{MAX}^{PUCCH}$ ratio for simultaneous transmission.

Among $N_{comp}$ component carriers, one component carrier can be set as a primary carrier (called as anchor carrier as well), and used for transmitting prioritized information such as control channel, system information and etc. In this case, the primary carrier should be prioritized to provide more reliable system performance. The maximum allowed transmission power in primary carrier can be $P_{MAX}$.

The remained power $$P_{MAX}^{remained}(i) = P_{MAX} - P_{primary}^{required}(i)$$

is shared with the other component carriers. In this case, the
$P_{MAX}^{remained}(i)$
can be also shared evenly between the remaining component carriers. In addition, the
$P_{MAX}^{remained}(i)$
can be used for secondary carrier which is used for transmitting prioritized information next to the primary carrier.

In addition, even though whole required power cannot be allocated to primary carrier, higher power also can be allocated to primary carrier. In this case, primary carrier can be reference carrier for power sharing information such as $P_{MAX}^{primary}(i)$ MAX.

the other component carrier power sharing information can be informed with minus delta offset of primary carrier such as $$P_{2,MAX}(i) = P_{MAX}(i) - \Delta_{offset}$$

where
$\Delta_{offset}$
is satisfying $$\Delta_{offset} \geq 0.$$

The
$P_{MAX}$
for each component carrier can be configured by higher layer signaling. Full flexibility can be supported in this case. However, complexity and control signaling overhead can be higher than the other methods mentioned above. This can be indicated by delta offset from reference carrier. If three component carriers are employed for a UE.
$P_{1,MAX}$,
$P_{2,MAX}$
and
$P_{3,MAX}$
can be each component carriers maximum transmission power. If
$P_{1,MAX}$
is the reference carrier, $$P_{2,MAX} = P_{1,MAX} - \Delta_{2,offset}$$

and $$P_{3,MAX} = P_{1,MAX} - \Delta_{3,offset}$$

can be informed to a UE.
$\Delta_{i,offset}$
may have a value having a predetermined range including '0'.

Meanwhile, weighted power sharing is also possible for multiple component carriers. The following Math Figure 14 shows weighted power sharing for multiple component carriers.

$$\begin{cases} P_{1,MAX} = \alpha_1 P_{MAX} \\ P_{2,MAX} = \alpha_2 P_{MAX} \\ \vdots \\ P_{N_{comp},MAX} = \alpha_{N_{comp}} P_{MAX} \end{cases}$$ [Math Figure 14]

In Math Figure 14, $$\alpha_1 + \alpha_2 + \ldots + \alpha_{N_{Comp}} = 1$$

is satisfied.
In addition, each component carrier can have separate $$P_{1,MAX}, i=1, \ldots N_{comp}$$

and the
$P_{i,MAX}$
can be shared with two or more uplink channels at a time and it can be also used for a single uplink channel. When
$P_{i,MAX}$
is shared with two or more uplink channels such as PUCCH, PUSCH and SRS, the power sharing can be prioritized. Among three channels, PUCCH could be most important since misdetection of control channel may harm system performance seriously. The PUUCH can be prioritized as the following Math Figure 15.

$$P_{MAX}^{PUCCH} = \sum_{i=1}^{N_{comp}} P_{i,MAX}^{PUCCH}$$ [Math Figure 15]

In Math Figure 15, all component carrier's
$P_{MAX}^{PUUCH}$
is guaranteed as same as $$P_{i,MAX}^{PUCCH} = K, i=1 \ldots N_{comp},$$

where
K
is a certain value to be used for PUCCH channel. The other uplink channels shares the remaining power.

FIG. 7 is a block diagram showing constitutional elements of a device 100 that can be either a UE or an eNB, and that can perform the methods described above. Device 100 includes a processor 101, a memory 102, a radio frequency (RF) unit 103, a display unit 104, and a user interface unit 105. Layers of the radio interface protocol are implemented in the processor 101. The processor 51 provides the control plane and the user plane. The function of each layer can be implemented in the processor 101. The processor 101 may also include a contention resolution timer. The memory 102 is coupled to the processor 101 and stores an operating system, applications, and general files. If device 100 is a UE, the display unit 104 displays a variety of information and may use a well-known element such as a liquid crystal display (LCD), an organic light emitting diode (OLED), etc. The user interface unit 105 can be configured with a combination of well-known user interfaces such as a keypad, a touch screen, etc. The RF unit 103 is coupled to the processor 51 and transmits and/or receives radio signals.

The embodiments described above are provided by combining constituent elements and features of the present invention in specific forms. The constituent elements or features of the present invention may be considered optional if not explicitly stated otherwise. The constituent elements or features may be implemented without being combined with other constituent elements or features. The embodiments of the present invention may also be provided by combining some of the constituent elements and/or features. The order of operations in the embodiments of the present invention may be changed. Some constituent elements or features of one embodiment may be included in another embodiment or may be replaced with corresponding constituent elements or features of another embodiment. It is apparent that the present invention may be embodied by a combination of claims which do not have an explicit cited relation in the appended claims or may include new claims by amendment after application.

The embodiments of the present invention have been described focusing on the data communication relationship between an eNB and a UE. Here, the eNB refers to a terminal node of a network communicating directly with the UE. In some cases, a specific operation described as being performed by the eNB may be performed by an upper node of the eNB.

Namely, it is apparent that the eNB or any other network nodes may perform various operations for communication with the UE in a network comprised of a plurality of network nodes including the eNB. The term eNB may be replaced with the term fixed station. Node B, access point, etc. The term UE corresponds to a mobile station (MS) and the MS may be replaced with the term subscriber station (SS), mobile subscriber station (MSS), mobile terminal, etc.

The UE employed in the present invention may be a personal digital assistant (PDA), a cellular phone, a personal communication service (PCS) phone, a global system for mobile (GSM) phone, a wideband code division multiple access (wide CDMA) phone, a mobile broadband system (MBS) phone, etc.

The embodiments of the present invention may be implemented by various means, for example, hardware, firmware, software, or a combination thereof.

In a hardware configuration, methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Software code may be stored in a memory unit so as to be driven b a processor. The memory unit is located at the interior or exterior of the processor and may transmit data to and receive data from the processor via various known means, The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

MODE FOR THE INVENTION

The embodiments of the present invention may be implemented by various means, for example, hardware, firmware, software, or a combination thereof.

In a hardware configuration, methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Software code may be stored in a memory unit so as to be driven by a processor. The memory unit is located at the interior or exterior of the processor and may transmit data to and receive data from the processor via various known means.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

INDUSTRIAL APPLICABILITY

As apparent from the above description, the present invention is applicable to a transmitter and a receiver for use in a communication system.

What is claimed is:

1. A user equipment for supporting multiple component carriers through carrier aggregation, comprising:
  a radio frequency (RF) unit, and
  a processor, coupled to the RF unit, configured to:
    control the RF unit to receive control information associated with respective maximum allowed powers for the multiple component carriers;
    determine a maximum transmission power $P_{MAX,PUCCH}$ of physical uplink control channel (PUCCH) and a maximum transmission power $P_{MAX,PUSCH}$ of physical uplink shared channel (PUSCH) for a component carrier x among the multiple component carriers; and
    determine a transmission power $P_{PUCCH}$ of the PUCCH within the maximum transmission power $P_{MAX,PUCCH}$ and a transmission power $P_{PUSCH}$ of the PUSCH within the maximum transmission power $P_{MAX,PUSCH}$; and
    control the RF unit to transmit the PUCCH at the transmission power $P_{PUCCH}$ and the PUSCH at the transmission power $P_{PUSCH}$ on the component carrier x,
  wherein the maximum transmission power $P_{MAX,PUCCH}$ is set to be $P_{MAX,x}$, where $P_{MAX,x}$ is a maximum allowed power for the component carrier x, and
  wherein the maximum transmission power $P_{MAX,PUCCH}$ is set to be '$P_{MAX,x} - P_{PUCCH}$', and
  wherein the multiple component carriers share a maximum transmission power $P_{MAX}$ of the user equipment.

2. The user equipment of claim 1, wherein the processor is configured to control the RF unit to transmit the PUCCH and the PUSCH simultaneously.

3. The user equipment of claim 1, further comprising:
  a plurality of antennas,
  wherein the RF unit is further configured to receive information indicating one or more antennas to be turned on or turned off and to transmit the PUCCH and the PUSCH through one or more antennas turned on.

4. The user equipment of claim 1, wherein the component carrier x is a primary component carrier among the multiple component carriers.

5. A method for transmitting uplink signal at a user equipment supporting multiple component carriers through carrier aggregation, comprising:
  receiving, by the user equipment, control information associated with respective maximum allowed powers for the multiple component carriers;
  determining, by the user equipment, a maximum transmission power $P_{MAX,PUCCH}$ of a physical uplink control channel (PUCCH) and a maximum transmission power $P_{MAX,PUSCH}$ of a physical uplink shared channel (PUSCH) for a component carrier x among the multiple component carriers based on a maximum allowed power for the component carrier x among the respective maximum allowed powers for the multiple component carriers;

determining, by the user equipment, a transmission power $P_{PUCCH}$ of the PUCCH within the maximum transmission power $P_{MAX,PUCCH}$ and a transmission power $P_{PUSCH}$ of the PUSCH within the maximum transmission power $P_{MAX,PUSCH}$; and transmitting, by the user equipment, the PUCCH at the transmission power $P_{PUCCH}$ and the PUSCH at the transmission power $P_{PUSCH}$ on the component carrier x, wherein the maximum transmission power $P_{MAX,PUCCH}$ is set to be $P_{MAX,x}$, where $P_{MAX,x}$ is the maximum allowed power for the component carrier x, wherein the maximum transmission power $P_{MAX,PUSCH}$ is set to be '$P_{MAX,x} - P_{PUCCH}$', and wherein the multiple component carriers share a maximum transmission power $P_{MAX}$ of the user equipment.

6. The method of claim 5, wherein transmitting the PUCCH and the PUSCH comprises transmitting the PUCCH and the PUSCH simultaneously.

7. The method of claim 5, wherein the user equipment includes a plurality of antennas, and the method further comprises:

receiving information indicating one or more antennas of the plurality of antennas to be turned on or turned off; and transmitting the PUCCH and the PUSCH through one or more antennas turned on.

8. The method of claim 5, wherein the component carrier x is a primary component carrier among the multiple component carriers.

* * * * *